(12) United States Patent
Sandholm et al.

(10) Patent No.: US 11,706,632 B1
(45) Date of Patent: Jul. 18, 2023

(54) AINO: AN AI NETWORK OPERATOR

(71) Applicant: Cable Television Laboratories, Inc., Louisville, CO (US)

(72) Inventors: Thomas Sandholm, Mountain View, CA (US); Bernardo Huberman, Palo Alto, CA (US); Sayandev Mukherjee, Santa Clara, CA (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/382,162

(22) Filed: Jul. 21, 2021

Related U.S. Application Data (60) Provisional application No. 63/054,338, filed on Jul. 21, 2020.

(51) Int. Cl.
*H04W 16/14* (2009.01)
*H04W 16/10* (2009.01)
*H04L 41/16* (2022.01)
*H04W 28/24* (2009.01)
*H04W 24/02* (2009.01)
*H04W 28/20* (2009.01)

(52) U.S. Cl.
CPC .......... *H04W 16/14* (2013.01); *H04L 41/16* (2013.01); *H04W 16/10* (2013.01); *H04W 24/02* (2013.01); *H04W 28/20* (2013.01); *H04W 28/24* (2013.01)

(58) Field of Classification Search
None
See application file for complete search history.

(56) References Cited

U.S. PATENT DOCUMENTS

| | | | | |
|---|---|---|---|---|
| 8,874,477 | B2 * | 10/2014 | Hoffberg | G06Q 20/065 705/37 |
| 11,037,222 | B1 * | 6/2021 | Natesh | G06Q 30/0631 |
| 2014/0355443 | A1 * | 12/2014 | Smith | H04W 28/0289 370/235 |
| 2016/0189167 | A1 * | 6/2016 | Smith | G06Q 50/163 705/37 |
| 2018/0357105 | A1 * | 12/2018 | Rishabh | G06F 9/5033 |
| 2020/0126126 | A1 * | 4/2020 | Briancon | G06N 3/006 |
| 2021/0337391 | A1 * | 10/2021 | Sevindik | H04W 24/02 |
| 2023/0059115 | A1 * | 2/2023 | Yan | G06F 9/451 |

FOREIGN PATENT DOCUMENTS

| | | | | |
|---|---|---|---|---|
| EP | 3706053 | A1 * | 9/2020 | G06N 3/0427 |

* cited by examiner

*Primary Examiner* — Gerald A Smarth
(74) *Attorney, Agent, or Firm* — Elevated IP, LLC (57) ABSTRACT

An artificial intelligence network operator (aiNO) that autonomously and dynamically acquires network resources on an open marketplace includes software running a machine learning model and a processor that controls backhaul connectivity and a network communication component. In some embodiments, the aiNO facilitates resale of the acquired network resource to end users.

19 Claims, 4 Drawing Sheets

AINO: AN AI NETWORK OPERATOR

CROSS-REFERENCE TO RELATED APPLICATIONS

This application claims the benefit of and priority to U.S. Provisional Patent Application No. 63/054,338, filed Jul. 21, 2020, which is hereby incorporated by reference in its entirety.

STATEMENT REGARDING FEDERALLY SPONSORED RESEARCH

None.

BACKGROUND

The current mobile network spectrum market is an oligopoly where competition, innovation, and efficient utilization are hampered by exclusive and expensive auctions (FCC spectrum auctions) or case-by-case bilateral agreements (roaming). Under the current system, expensive spectrum auctions generate substantial revenue for the government while serving as a barrier to entry for competitors to the incumbent mobile network operators (MNOs). Further, new communication protocols, such as 5G, are pushing cell sizes to be smaller in order to increase coverage and capacity and allow for bands with higher frequencies and throughput. This, however, requires additional backhaul capacity and expensive real estate, which further limits entry into the MNO market.

In theory, sharing spectrum would allow operators to earn more revenue and improve service quality by selecting the best available spectrum for a particular purpose, but in practice, transaction costs and other factors limit such agreements. Instead, wireless providers acquire spectrum licenses corresponding to certain portions of spectrum with certain properties where wireless transport conditions vary according to not just the band center frequency, but the amount of available spectrum, the amount of noise, the propagation characteristics in the band, the rules relating to transmit power and antenna characteristics that each band is subject to, and the network and radio infrastructure that supports it.

The intended wireless services also have a different set of requirements and perform differently depending on channel and infrastructure characteristics. Some services, like mobility, perform better in a lower frequency environment, where larger cells are possible, while others, like high capacity uploads, perform better at higher frequencies, where mobility is not needed and more capacity is available. Unfortunately, in the current environment the owner of a certain spectrum has to fit their services to their specific environment in a sub-optimal fashion.

SUMMARY

Devices, software, network architectures, and methods for monetizing unused spectrum, real estate, and backhaul investments using an optionally self-contained, fully autonomous hardware and/or software network platform are disclosed herein. The devices, software, network architectures and methods overcome the business challenges of subscribers jumping from one network to another or from one channel to another. At the same time, the devices, systems, software and methods allow providers to more efficiently use their resources and enable them to monetize unused network resources through intelligent algorithms that assess instantaneous fair market value.

As an example, an exploration-exploitation algorithm: (a) purchases spectrum license rights on demand on an open market, rather than from the FCC; (b) stands up a full mobile network on the acquired band; and (c) offers bandwidth micro contracts to end-users. Bands that generate the most revenue will be learned and can change over time based on the location where the system is deployed and the mobile users the deployment serves.

Although wireless mobile networks and spectrum acquisition are discussed throughout this disclosure, the present devices, systems, methods, software and architectures are not limited to wireless systems and/or spectrum acquisition. Wired systems and hardware resources may also be sold/acquired in an open marketplace. Examples of such resources include backhaul connectivity, reliability embedded in a network, other parameters that operators can control, transport characteristics (latency/shortest connection), mobility, experience parameters, and the like.

In an embodiment, the deployment is a plug-and-play black box model, where an LTE/5G software stack has a programmable software defined radio (SDR) as front end and Ethernet, fiber or cable DOCSIS backhaul as back-end.

In an embodiment, a deployment may be purely virtual. In a service-only mode, for example, an MNO may have a customer(s), and it may acquire all other resources (e.g., backhaul capacity, transmission/communication capacity) from a network-resource auctioneer.

In an embodiment, where an existing or future MNO already has backhaul connectivity and communication and processing capabilities, the processor may be updated to include the artificial intelligence software disclosed herein that autonomously and dynamically selects and leases network resources.

According to an embodiment, a would-be MNO can: (a) bid on spectrum bands for short-term licenses over restricted geographical areas, then (b) re-sell the leased spectrum in the form of bandwidth to end-users to generate revenue. Re-selling to end-users is described in U.S. patent application Ser. No. 17/192,539, filed Mar. 4, 2021, which is hereby incorporated by reference in its entirety. The only requirements for a would-be entrant into the network operator space would then be access to a backhaul and access to real estate on which to install transmission equipment, both of which may optionally be purchased or leased in a network-resource marketplace.

In an aspect, a non-transitory computer-readable medium has a plurality of non-transitory instructions executable with a processor for autonomously acquiring network resources, the plurality of non-transitory instructions are executable for: (i) receiving information about network resource rights being offered by a network-resource auctioneer; (ii) determining which network resource right(s) to acquire from the network-resource auctioneer; (iii) autonomously acquiring the network resource right(s); and (iv) instructing a communication component to transmit or receive communication signals via a network resource associated with the network resource right(s). In addition, the plurality of non-transitory instructions may be further executable for continuously or periodically repeating (i)-(iv) in order to dynamically select and acquire network resource rights that improve quality of experience metrics.

In an embodiment, the plurality of non-transitory instructions are further executable for communicating with a bandwidth auctioneer to facilitate end user bandwidth leases.

In an embodiment, acquisition of network resource rights includes, but is not limited to, purchasing, trading, or otherwise obtaining.

In an embodiment, the network-resource auctioneer comprises a database of network resource rights available for acquisition. The network resource rights are offered for short-term/temporary sale, lease, rent, trade or borrow by network resource owners having excess or unused capacity. For example, the network resource may be selected from the group consisting of spectrum or a portion of spectrum, usage of network hardware, such as a backbone, backhaul, transceiver, repeater, a base station, etc., real estate and combinations thereof.

In an embodiment, a communication component for transmitting or receiving communication signals via a network resource associated with an acquired network resource right is a signal generator, a signal detector, a wireless transceiver or a combination thereof. For example, a wireless transceiver may be a software defined radio (SDR) or a fixed frequency radio.

In an embodiment, determining which network resource right(s) to acquire comprises predicting which resource(s) will optimize a reward function using a machine learning model trained on previously implemented network resource rights and associated quality of experience (QoE) metrics, where a QoE metric is at least partially based on throughput, latency, dropped frames, reliability, upload rate, download rate, mobility, SINR, and/or combinations thereof.

In an embodiment, a network-resource auctioneer is a local database, a centralized database (e.g., global or regional), or a cloud-based database.

In an aspect, an artificial intelligence network operator (aiNO), comprises a device housing: a communication component; a processor configured to: (i) receive information about network resource rights being offered by a network-resource auctioneer; (ii) determine which network resource right(s) to acquire from the network-resource auctioneer; (iii) autonomously acquire the network resource right(s); and (iv) instruct the communication component to use a network resource associated with the network resource right(s); and an interface for connecting the processor and the communication component to a backhaul system. The interface may, for example, be an evolved packet core (EPC), an eNodeB (eNB), a gNodeB (gNB), a gateway, or a combination thereof.

In an aspect, a network architecture comprises an aiNO device disclosed herein; a network-resource auctioneer comprising a database of network resource rights available for acquisition; and a network resource ledger configured to authenticate network resource rights acquisitions; wherein the aiNO, the network-resource auctioneer, and the network resource ledger are in operable communication with one another through a backhaul system. Typically, acquisitions of network resource rights are recorded in a network resource ledger as atomic transactions (e.g., using Blockchain technology).

In an embodiment, a network architecture further comprises a second database of bandwidth available for lease by user equipment and a bandwidth ledger configured to authenticate bandwidth leases. Typically, acquisitions of bandwidth by UEs are recorded in a bandwidth ledger as atomic transactions (e.g., using Blockchain technology).

BRIEF DESCRIPTION OF THE DRAWINGS

Illustrative embodiments of the present invention are described in detail below with reference to the attached drawings.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, a "reward function" refers to a calculated metric representing quality of experience (QoE) as a function of price. An "optimized" reward function is the highest relative reward function value produced from a plurality of resource packages when a high QoE metric, or combination of QoE metrics, objectively produces the best network experience (e.g., highest throughput, fastest upload or download rate, etc.). An "optimized" reward function is the lowest relative reward function value produced from a plurality of resource packages when a low QoE metric, or combination of metrics, objectively produces the best network experience (e.g., lowest latency, fewest dropped frames, etc.). Reward functions for use in telecommunication systems are described in detail in U.S. patent application Ser. No. 17/192,539, filed Mar. 4, 2021, which is hereby incorporated by reference in its entirety.

"Resource package", as used herein, refers to the right to use one or more network resources for a specified period of time and specified price.

Figure 1:
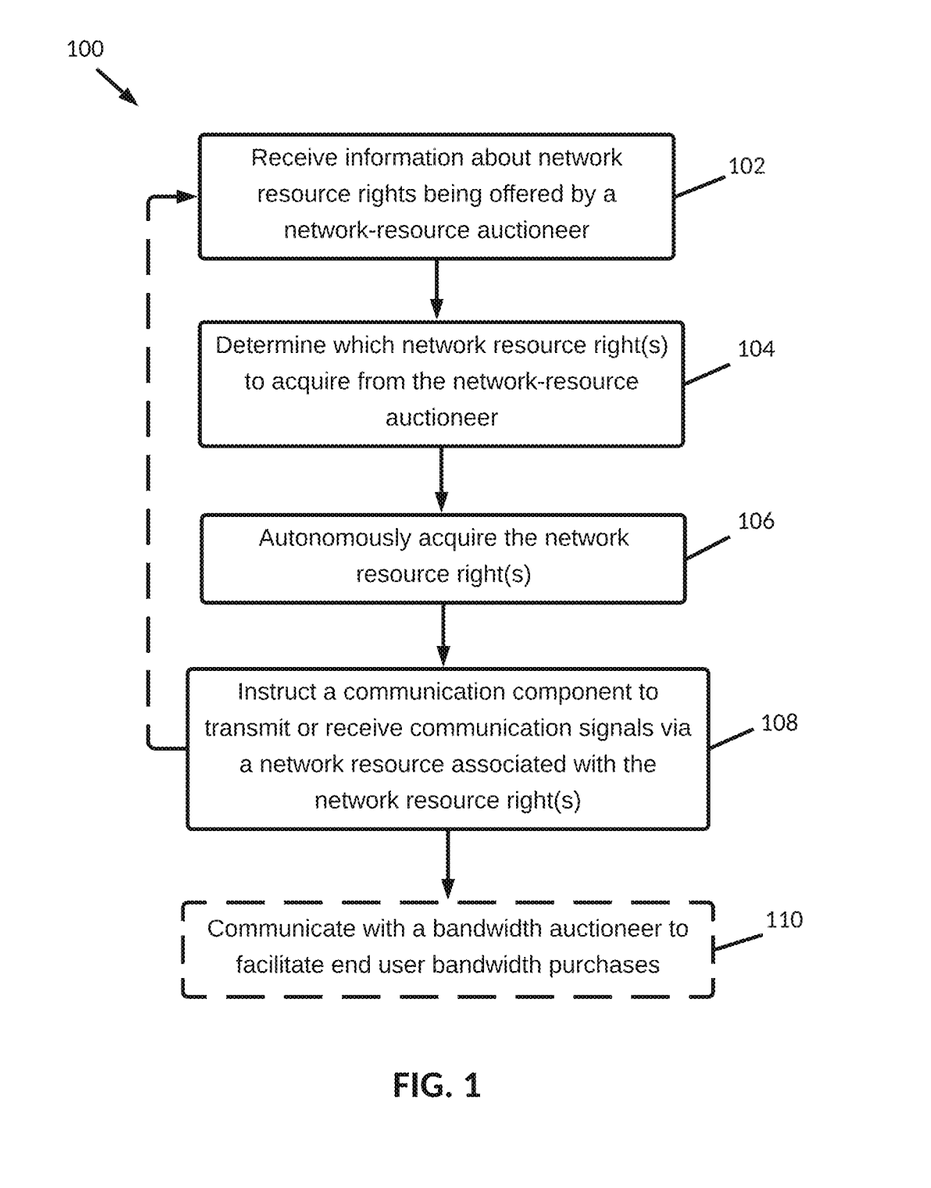
FIG. 1 is a flowchart of instructions carried out by a processor to autonomously acquire a network resource(s), according to an embodiment.

FIG. 1 is a flowchart 100 of instructions carried out by a processor of an aiNO device (see FIG. 2) to autonomously acquire a network resource(s), according to an embodiment. In step 102, the processor receives information about network resource rights being offered by a network-resource auctioneer, which may have a database of network resource rights being made available for acquisition by rights holders. For example, the network resource right may be the right to use one or more network resources, such as but not limited to, a portion or all of any one of the following, for a specified period of time: spectrum, backbone, backhaul, real estate, a base station, a node, or a transmitter. In step 104, the processor determines which network resource right(s) to acquire from the network-resource auctioneer, and in step 106, the processor autonomously acquires the network resource right(s), in step 106. For example, the processor may use an artificial intelligence (AI) model, such as a reinforcement learning model, to acquire a network resource at a particular price.

Once a network resource right has been acquired and authenticated, e.g., via an atomic transaction, the processor receives instructions for accessing the resource (from the network resource auctioneer or directly from the network resource owner) and instructs a communication component of the aiNO device to transmit or receive communication signals via the network resource associated with the network resource right(s) (step 108). Following usage of the resource, a reward function may be calculated for the acquisition, which will then be used in a feedback loop to continuously update the AI model. In most embodiments, steps 102-108 are continuously repeated to acquire short-term leases for network resources needed to satisfy user demand at a given time and location.

When the acquired resource is spectrum, the processor communicates with a bandwidth auctioneer, in step 110, to obtain information about bandwidth epoch pricing, to notify the bandwidth auctioneer of bandwidth epochs available for lease by end users, to obtain information on filled orders, and/or to provide instructions for winning bidders to access their leased bandwidth.

Figure 2:
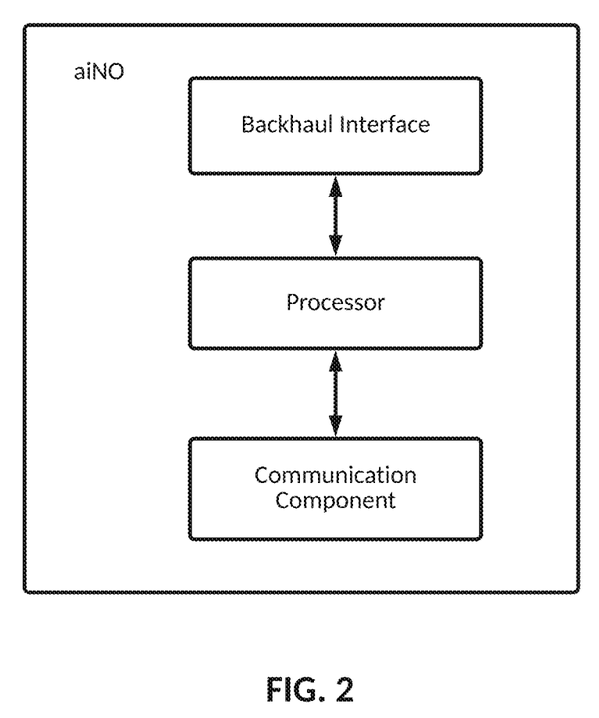
FIG. 2 is a block diagram of an artificial intelligence network operator (aiNO) device for autonomously acquiring and utilizing network resources, according to an embodiment.

FIG. 2 is a block diagram of an artificial intelligence network operator (aiNO) device for autonomously acquiring and utilizing network resources based on local user demand and cost. As shown, the aiNO device houses all components of an MNO, although the present disclosure contemplates embodiments where the components are separately housed or cloud-based. The aiNO comprises a processor for executing, at least, the instructions discussed with respect to FIG. 1, a backhaul interface for enabling communication with a cable hub, satellite provider and/or telephone exchange/central office, and a communication component controlled by the processor. For example, the communication component may be a signal generator, a signal detector, a wireless transceiver or a combination thereof. In an especially useful embodiment, the communication component is a dynamically reconfigurable software defined radio (SDR) programmed by the processor. The backhaul interface may be a software EPC, an eNB, a gNB, a gateway or a combination thereof.

Figure 3:
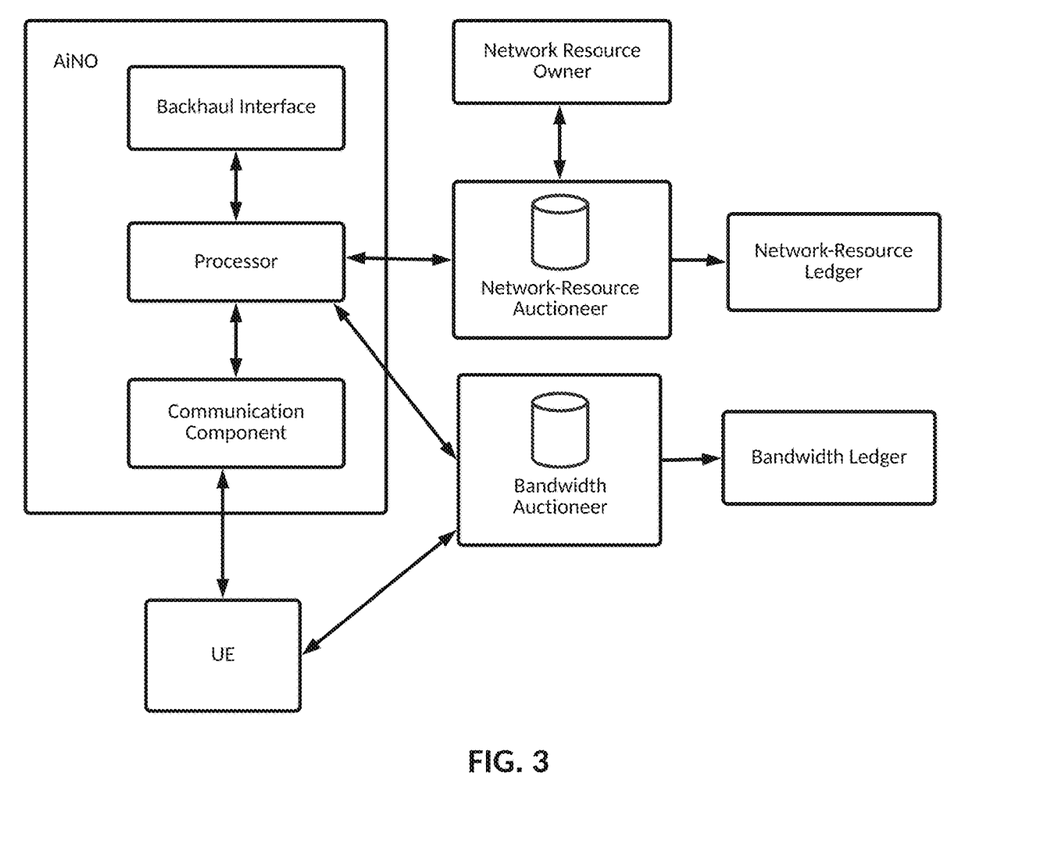
FIG. 3 is a block diagram of a network architecture, including the aiNO device of FIG. 2, enabling marketplace acquisition of network resources by MNOs, and optionally bandwidth resale to UEs, according to multiple embodiments.

FIG. 3 is a block diagram of a network architecture, including the aiNO device of FIG. 2, enabling marketplace exchange of network resources to MNOs, and optionally bandwidth to UEs, according to multiple embodiments. In operation, a network resource owner, such as an entity having a license to operate on a spectrum market, makes the resource or a portion of it available for acquisition through an open auction on the network-resource auctioneer, which may be disposed within a SAS accessible by all aiNOs. The network-resource auctioneer may receive auction parameters from the network resource owner or a processor of the network-resource auctioneer may set prices for the resources based on bids. The aiNO then discovers and bids on an available network resource using data about previous acquisitions and revenue collected through user traffic to make decisions on which resources to acquire and how much to pay for those resources. The winning bid is determined by the auctioneer, and an atomic transaction (e.g. Blockchain contract) is recorded in a network-resource ledger. A processor of the aiNO periodically checks the status of its bid, and if its bid was executed on a resellable resource (e.g., spectrum) the aiNO processor creates an auction and publishes the auction details to a bandwidth auctioneer and/or UEs within range. Alternatively, a processor of the bandwidth auctioneer may set the bandwidth prices based on bids. UEs then bid on bandwidth epochs, via communication with the aiNO, which forwards the bid to the bandwidth exchange, or via communication directly with the bandwidth auctioneer, which may reside within the aiNO, within the cloud, or within a remote server. The winning bid(s) is/are determined and recorded as atomic transactions (e.g., Blockchain contracts) in a bandwidth ledger. The aiNO then makes credentials available to the winning bidder(s) to start attaching to the network. For example, the successful bids may get newly generated AKA parameters that are sent through LTE NAS to the UE, which uses the AKA parameters (IMSI, master key, etc.) to authenticate to the aiNO LTE network with the standard NAS Attach protocol.

Generally, spectrum resources available for acquisition are spatially and/or temporally limited. For example, spectrum ranges (e.g. LTE bands) in highly localized locations, e.g. one block of a neighborhood, may be acquired for a short time, e.g., minutes, hours, or days.

As an example of the disclosed software, methods, devices, and architectures in practice, descriptions of how a would-be MNO would acquire short-term to mid-term spectrum leases, and the way it would re-sell the spectrum in the form of bandwidth to users is provided below.

The FCC has taken preliminary steps to free up spectrum for the Citizens Broadband Radio Service (CBRS) using a Spectrum Access System (SAS). The software, methods, devices, systems and architectures disclosed herein can be deployed over CBRS, where the would-be MNO acquires a license under the Priority Access or General Authorized Access tiers, especially the latter, because the spectrum licenses are expected to be short-term to medium-term (a few days to a few months). Note also that the short-term spectrum licenses are provided over tightly restricted geographical areas, unlike traditional FCC licenses which tend to emphasize large-area coverage.

The existence of local and regional markets for spectrum sales, where the incumbent spectrum license holders (including those who acquired a traditional long-term spectrum license at an FCC auction) can resell or sublet their spectrum in the short- or medium-term provides an opportunity for license holders to monetize their unused or underutilized spectrum to would-be MNOs, but the presence of such markets is also beneficial for incumbent holders of traditional long-term, large-area licenses won at FCC spectrum auctions. For example, an MNO that has some under-utilized low-frequency spectrum (desirable for its penetration and long range, but limited in actual bandwidth available) may trade a portion of the low-frequency spectrum for some high-frequency spectrum (with larger bandwidth available) to another MNO in order to support higher data rates to its subscribers.

One way to enable such a market, to process and validate the transactions, and to authorize the spectrum leases purchased on such a market is described in U.S. patent application Ser. No. 17/192,539, which discloses systems and methods for UE bandwidth acquisitions. Here, the concept is expanded to acquisitions by MNOs instead of end-users, with the following benefits:

The ability for an end-user to obtain higher peak and sustained data rates by purchasing bandwidth as needed from one or more sellers (MNOs) on the bandwidth market. Note that this may include channel aggregation from multiple sellers on multiple bands. It may also include MIMO and/or CoMP from multiple transmitters belonging to more than one provider.

Robustness of the overall cellular network infrastructure to congestion and outage; if one MNO experiences severe congestion or even an outage in some part of its network, its subscribers can quickly switch to some other MNO(s) for uninterrupted service.

All that a would-be MNO needs to begin generating revenue from end users is a backhaul to plug its transmission equipment into, and real estate on which to deploy this transmission equipment, although service-only models are also contemplated. The upcoming deployment of dense small cells in 5G networks represents a strong business opportunity for MSOs to generate new revenue by carrying the backhaul traffic from these 5G small cell sites over DOCSIS. Since the present invention removes the spectrum availability barrier to entry into the MNO space, it also facilitates MSOs, which already have the backhaul, to start offering wireless cellular service as MNOs.

A provider that owns infrastructure and facilities has the means to monetize its resources based on a variety of metrics, such as:
  Center frequency (transmission characteristics)
  Peak and sustained service rates (more spectrum available implies higher peak rates. If spectrum bandwidth is high and occupancy low, then the sustained rate is higher)
  Transmit power (capacity/quality of experience)
  Tower/density and tower height (impacts occupancy, peak rate and sustained rate)
  MIMO order (capacity/peak rate)
  Channel aggregation capability (capacity/peak rate)
  Mobility/Pseudo Stationary (type of service, impacted by center frequency)
  Backhaul (what is the capability of the backhaul infrastructure)

Providers will be motivated to place wireless sites in optimal locations because they know that they have the opportunity to monetize and recover their investment. Providers will also be discouraged from overbuilding since they can leverage other providers' resources. This leads to better coverage with less wasted capital, infrastructure, and land.

Providers that do not have sufficient spectrum resources and facilities in a particular region at a particular time can lease resources to fulfill performance commitments to their subscribers (SLAs).

For example, an operator with high radio density, which is good for mobility, or with network resources generating short latency, which would be good for high frequency transactions, could sell a portion of their resource on the marketplace, and potentially acquire other complementary resources. Thus, operators could use their network resources according to the resource's best/highest use (e.g., mobility), and acquire resources to meet consumer needs that the operator is not especially well equipped to handle (e.g., upload/download capacity).

Figure 4:
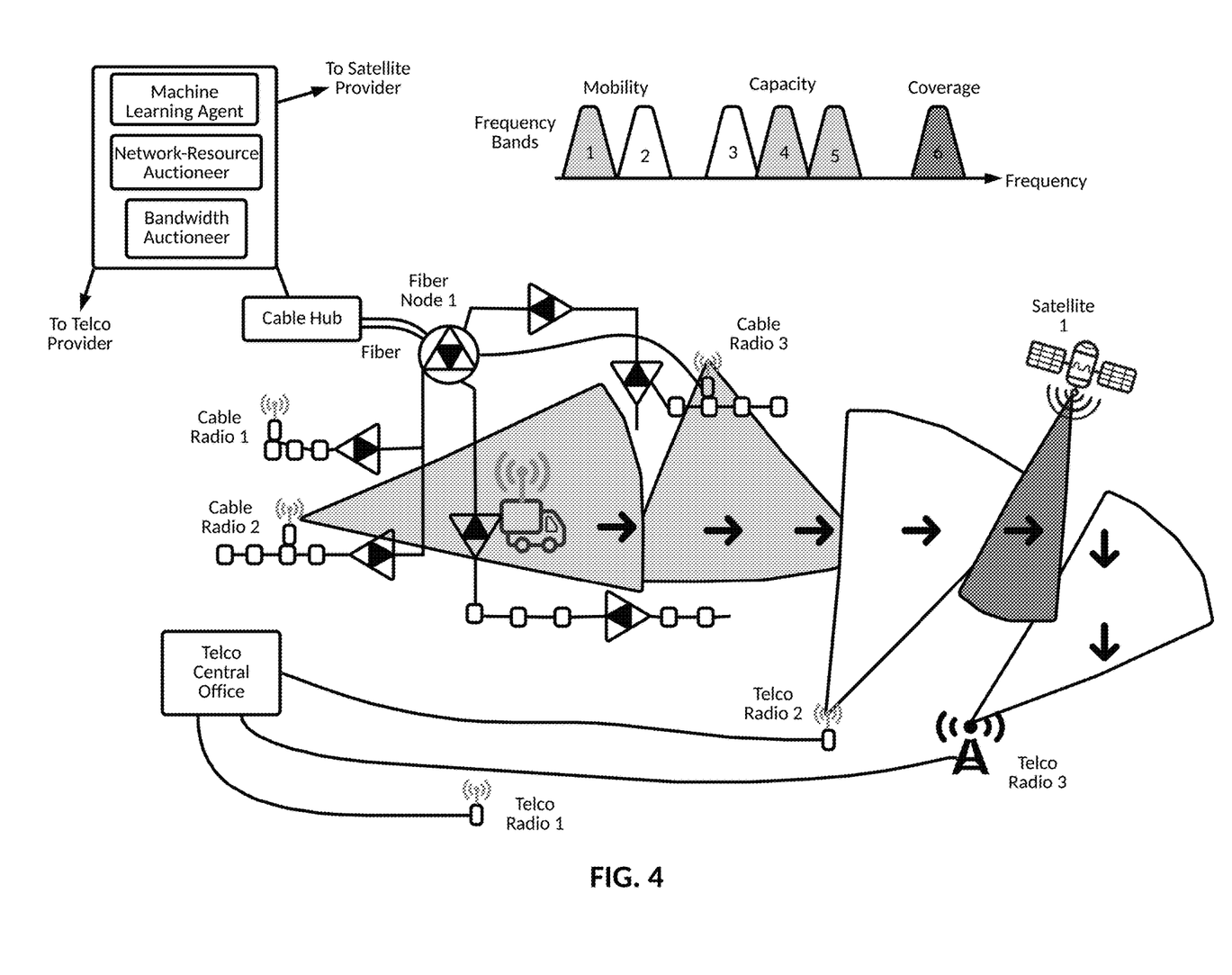
FIG. 4 is a schematic of a network architecture, incorporating an aiNO device, in operation, according to an embodiment.

FIG. 4 is a schematic of a network architecture, incorporating an aiNO device, in operation, according to an embodiment. A plurality of frequency bands occupying parts of the spectrum beneficial for mobility (bands 1 and 2), capacity (bands 3-5) and coverage (band 6) are used by three different network operators (telco (white), cable (gray), satellite (dark gray)). In the embodiment shown, the aiNO device includes a machine learning agent (e.g., a processor executing instructions for a machine learning model), a network-resource auctioneer, and a bandwidth auctioneer. The aiNO device is in operable communication with a cable hub, a satellite provider and a telephone central office. A mobile user (car) first receives a signal from cable radio 2 (gray cone). As the user moves along the path shown by black arrows, the signal is transmitted by cable radio 3 (gray cone), then to telco radio 2 (white cone), satellite 1 (dark gray cone), and finally teleco radio 3 (white cone). This type of seamless service can be coordinated by an aiNO acquiring resources for multiple providers (e.g., cable, satellite, telco), but aiNOs acquiring network resources for only one type of network provider (e.g., cable, satellite, telco) and/or for only one location (e.g., a campus, a building, a neighborhood, a home) are also contemplated.

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A non-transitory computer-readable medium having a plurality of non-transitory instructions executable with a processor for acquiring network resources, the plurality of non-transitory instructions being executable for:
   receiving information about network resource rights being offered by a network-resource auctioneer;
   (ii) determining which network resource right(s) to acquire from the network-resource auctioneer by predicting which network resource right(s) will optimize a reward function using a machine learning model trained on previously implemented network resource rights and associated quality of experience (QoE) metrics;
   (iii) acquiring the network resource right(s); and
   (iv) instructing a communication component to transmit or receive communication signals via a network resource associated with the network resource right(s).

2. The non-transitory computer-readable medium of claim 1, wherein the plurality of non-transitory instructions are further executable for continuously or periodically repeating (i)-(iv).

3. The non-transitory computer-readable medium of claim 1, wherein the plurality of non-transitory instructions are further executable for receiving information from a bandwidth auctioneer relating to requests from user equipment (UE) for bandwidth.

4. The non-transitory computer-readable medium of claim 1, wherein the network-resource auctioneer comprises a database of network resource rights available for acquisition.

5. The non-transitory computer-readable medium of claim 1, wherein the network resource is selected from the group consisting of spectrum, backbone connectivity, backhaul connectivity, a radio transceiver, a repeater, and a base station.

6. The non-transitory computer-readable medium of claim 1, wherein the communication component is a signal generator, a signal detector, a wireless transceiver or a combination thereof.

7. The non-transitory computer-readable medium of claim 6, wherein the wireless transceiver is a software defined radio (SDR) or a fixed frequency radio.

8. The non-transitory computer-readable medium of claim 1, wherein the QoE metric is at least partially based on throughput, latency, dropped frames, reliability, upload rate, download rate, mobility, and/or SINR.

9. The non-transitory computer-readable medium of claim 1, wherein the network-resource auctioneer is a local database, a centralized database, or a cloud-based database.

10. An artificial intelligence network operator (aiNO), comprising:
a device housing:
a communication component;
a processor configured to:
(i) receive information about network resource rights being offered by a network-resource auctioneer;
(ii) determine which network resource right(s) to acquire from the network-resource auctioneer by predicting which network resource right(s) will optimize a reward function using a machine learning model trained on previously implemented network resource rights and associated quality of experience (QoE) metrics;
(iii) acquire the network resource right(s); and
(iv) instruct the communication component to use a network resource associated with the network resource right(s); and
an interface for connecting the processor and the communication component to a backhaul system.

11. The aiNO of claim 10, wherein the communication component is a signal generator, a signal detector, a wireless transceiver or a combination thereof.

12. The aiNO of claim 10, wherein the wireless transceiver is a software defined radio (SDR) or a fixed frequency radio.

13. The aiNO of claim 10, wherein the network resource is selected from the group consisting of spectrum, backbone connectivity, backhaul connectivity, a radio transceiver, a repeater and a base station.

14. The network architecture of claim 13, wherein the network resource is selected from the group consisting of spectrum, backbone connectivity, backhaul connectivity, a radio transceiver, a repeater and a base station.

15. A network architecture, comprising:
the aiNO of claim 10;
a network-resource auctioneer comprising a database of network resource rights available for acquisition; and
a network resource ledger configured to authenticate network resource rights acquisitions;
wherein the aiNO, the network-resource auctioneer, and the network resource ledger are in operable communication with one another through a backhaul system.

16. The network architecture of claim 15, wherein the acquisitions are recorded in the network resource ledger as atomic transactions.

17. The network architecture of claim 15 further comprising a second database of bandwidth available for lease by user equipment and a bandwidth ledger configured to authenticate bandwidth leases.

18. The network architecture of claim 15, wherein the communication component is a signal generator, a signal detector, a wireless transceiver or a combination thereof.

19. The network architecture of claim 18, wherein the wireless transceiver is a software defined radio (SDR) or a fixed frequency radio.

* * * * *